3,086,942
LUBRICANTS CONTAINING VARIOUS CROSS-LINKED SUBSTANCES AS THICKENING AGENTS
Jerome Panzer, Roselle Park, and James E. Shewmaker, Fanwood, N.J., assignors to Esso Research and Engineering Company, a corporation of Delaware
No Drawing. Filed Feb. 1, 1960, Ser. No. 5,646
6 Claims. (Cl. 252—40.5)

This invention relates to lubricating oil compositions containing cross-linked polymers. Particularly, it relates to lubricating greases and fluids containing certain metal salts and cross-linked polymers which can be derived from a material selected from the group consisting of vegetable oils, waxes, oxidized polymers and divinyl aromatics. Vegetable oils, waxes and oxidized polymers when subjected to ionizing radiation, and divinyl aromatics when subjected to radiation or heat, give products which on combination with salts of low molecular weight acids can be used to form greases and fluid lubricants with excellent anti-wear properties, structural stability, load-carrying properties, and oxidation stability While the vegetable oils, waxes and oxidized polymers may be cross linked solely by means of ionizing radiation, it is desirable to use an aromatic divinyl cross-linking agent in order to increase both the rate and extent of cross linking. In the case of the materials included above, which tend to break down in an oxidizing atmosphere, a cross-linking agent can be used to good advantage to facilitate cross linking without undue breakage of the main carbon chains.

The cross-linking agents which have been found particularly effective are those possessing at least two double bonds, such as materials of the divinyl aromatic type. These materials have the general formula:

$$\text{Ar(CH=CH}_2\text{)}_2$$

wherein Ar is an aryl group including unsubstituted aryl groups such as phenyl, biphenyl and naphthyl; and alkyl-substituted aryl groups, such as those substituted with about 1 to 3 alkyl radicals containing 1 to 20, e.g. 1 to 6, carbon atoms per alkyl group. Examples of such compounds include divinyl benzene, divinyl toluene, divinyl xylene, divinyl naphthalene, etc. Surprisingly, it has been found that other similar materials, even well-known chemical cross-linking agents, do not give the same results as the aromatic divinyl type of cross-linking agents.

The cross-linked substances are prepared by irradiating vegetable oils such as castor oil, soya oil, linseed oil, mustard seed oil, peanut oil, cottonseed oil, etc., waxes obtained from petroleum oils, and oxidized polymers such as oxidized copolymers of butadiene and styrene, in the presence of cross-linking agents such as described above.

The waxes useful in this invention as materials to be irradiated include both paraffin and microcrystalline waxes. The paraffin waxes are removed from lube fractions boiling below about 900° F. (atmospheric equivalent vapor pressure) and consist mainly of non-branched straight-chain paraffins. From 5% to 30% of the total wax composition may be made up of naphthenes (a saturated 5- or 6-membered ring with a long paraffin side chain) and isoparaffins having a single branch in the paraffin chain near one end. The microcrystalline waxes have a higher molecular weight and are recovered from crude oil fractions boiling above about 900° F.

The oxidized polymers of this invention are prepared from liquid polymers of conjugated diolefins, such as butadiene, or copolymers of such diolefins with vinyl aromatic hydrocarbons, such as styrene. The polymers are subjected to blowing by air or oxygen in the presence of a sodium, cobalt, lead, iron or other suitable catalyst at a temperature between 20° and 150° C. for about 1 to 2 hours in the presence of a hydrocarbon diluent, preferably an aromatic hydrocarbon or fraction having a kauri-butanol value of at least 40 to produce a resin or resin-like material. These polymers have molecular weights up to 10,000 and viscosities up to 22 poises at 50% N.V.M. The preferred oxidized polymer of this invention is a 80/20 wt. percent blend of butadiene and styrene which may be prepared with a sodium catalyst in the presence of a hydrocarbon diluent and a dioxane modifier. Prior to oxidation, the non-volatile portion thereof had an average molecular weight of about 8,000. It is subsequently partially oxidized by subjecting it to partial air flow. The oxidized polymer has at least 8% oxygen in its structure.

The cross linking of these materials may be carried out by dissolving or suspending about 5 to 98, e.g. 80 to 95, wt. percent of the material to be cross linked in a solvent inert to radiation. Preferred solvents are n-heptane, cyclohexane, benzene and their various homologs; saturated or predominantly aromatic petroleum distillates boiling below 150° C.; or the various halogenated hydrocarbons, ethers, ketones, etc. or other solvents showing little or no reaction in the presence of radiation. If the cross-linking agent is used, then preferably from about 1 to 25, e.g. 2 to 20, wt. percent of the aromatic divinyl compound (based on the polymer) is also dissolved in the solvent. This solution is then subjected to high energy ionizing radiation until the optimum extent of cross linking for the particular polymer is attained. However, the solvent is not essential as the vegetable oils, waxes and oxidized polymers, with or without the cross-linking agent, may be dissolved, swollen or suspended in oil used to make the lubricant and then irradiated; or the substances to be cross linked may be swollen with the cross-linking agent and then irradiated; or the starting substances per se may be irradiated in bulk; or the cross-linking agent may be milled into the starting substances or mixed into the melted starting materials and then irradiated, etc.

It has also been found that the cross-linking agent of this invention discussed above may be subjected to irradiation itself to form a cross-linked polymer. When this polymer is combined with the same metal salts as used with the other cross-linked materials of the invention a grease results. These greases have excellent anti-wear properties, and high temperature and structural stability. They are especially useful as radiation-resistant lubricants because of the tendency of aromatic products to absorb radiation and disperse it. The divinyl aromatic polymer may be prepared in situ by heating the divinyl aromatic substance or by irradiating it. As with the other greases of the invention, the presence of a dispersing agent as described is desirable.

The radiation will be high energy ionizing radiation from terrestrial sources consisting of: photons having a wave length less than 50 A., such as gamma and X-rays; rapidly moving charged or uncharged particles of an atomic or subatomic nature having an energy above 30 ev., such as beta rays and neutrons; of sufficient intensity such that the dose rate is at least 100 equivalent roentgens per hour. This excludes radiation such as cosmic and ultraviolet.

The radiation can be obtained from artificial accelerators, charged particle accelerators such as Van de Graaff generators, X-ray machines, etc.; from nuclear reactors such as atomic piles; from waste from nuclear reactors such as spent fuel elements or portions thereof; and from materials or radioisotopes especially made radioactive in a nuclear reactor, such as colbalt 60. The use of radioisotopes or accelerators is preferred, and it is also preferred that the radiation consist essentially of gamma or beta rays, i.e., be free from neutrons, because of safety and convenience.

It is desirable (but not necessary) that the dose rate be above at least 0.01 equivalent megaroentgen per hour, and that the total dosage will generally be about 0.5 to 75 megaroentgens, e.g. 1 to 50, megaroentgens. The materials to be polymerized can be exposed to the radiation source in any convenient manner. If a radioisotope is used, the material can be placed near the radioisotope in a batchwise manner, or simply flowed in, through, or around the isotope in suitable conduits. The radiation may be carried out at temperatures of about 50 to 400° F., e.g. 78 to 350° F., with or without stirring.

After the cross-linking reaction is carried out, the solvent (if used) may be distilled off to leave the cross-linked polymer as a residue.

To prepare the greases, a cross-linked substance, low molecular weight salt, surface-active agent where needed and oil base can be blended together and heated to dehydration, if necessary.

Fluid lubricants may be prepared by diluting greases with the appropriate base oil or by blending the ingredients directly in the desired concentrations. Homogenization improves the structural stability of both greases and fluids but is not a necessary operation.

The concentration ranges of the materials comprising the lubricating compositions are as follows in weight percent based on the final composition: irradiated material 0.1% to 25% with 1% to 10% preferred; salt 5% to 50% with 10% to 40% preferred; surface-active agent 0.001% to 5% with 0.1% to 3% preferred; base oil 40% to 94% with 60% to 85% preferred.

The metal salts which are used include alkali metal (e.g. lithium and sodium) and alkaline earth metal (e.g. calcium, strontium, and barium) salts of $C_1$ to $C_6$ carboxylic acids (e.g. acetic, propionic, furoic acids, etc.) or of inorganic mineral acids, such as nitric acid, sulfuric acid, phosphoric acid, nitrous acid, carbonic acid, hydrochloric acid and the like. Specific examples of such salts include: calcium acetate, trisodium phosphate, disodium acid phosphate, sodium nitrate, sodium nitrite, calcium carbonate, calcium chloride, calcium nitrate, calcium sulphate, calcium chloride, calcium phosphate and the like.

The lubriating oil may be either a mineral lubricating oil or a synthetic lubricating oil. Examples of the latter include esters of monobasic acids (e.g. $C_8$ Oxo alcohol ester of $C_8$ Oxo acid); esters of dibasic acids (e.g. di-2-ethyl hexyl sebacate); esters of glycols (e.g. $C_{13}$ Oxo acid diester of tetraethylene glycol); esters of phosphoric acid (e.g. the ester formed by contacting three moles of the monomethyl ether of ethylene glycol with one mole of phosphorous oxychloride); halocarbon oils, alkyl silicates, sulfite esters, mercaptals, polyglycol-type synthetic oils, etc.

Various other additives or thickening agents may also be incorporated in the lubricating composition in amounts of 0.001 to 15 wt. percent. For example, detergents such as calcium petroleum sulfonate; oxidation inhibitors such as phenyl alpha naphthylamine; viscosity index improvers such as polyisobutylene; corrosion inhibitors, such as sorbitan monooleate; pour depressants; dyes; other grease thickeners and the like may be used. The presence of dispersing agents is particularly desirable in those instances where the salt has a tendency to settle out of the composition.

Dispersing agents which have been found particularly suitable are of the following types:

I. Alkylolamides of fatty acids having the general formula:

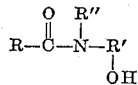

wherein R is a $C_8$ to $C_{20}$ alkyl group, R' is a $C_2$ to $C_9$ alkyl group with the hydroxyl group attached to any one of the carbon atoms of R' and R'' is H or R'—OH. A specific example of such materials is a N,N-di(2-hydroxy ethyl) lauramide known commercially as Nopcogen 12–L with the following formula:

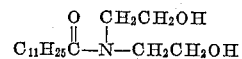

II. Alkylphenoxy polyoxyethylene alcohols and ethers of the general formula:

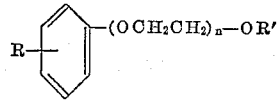

wherein R is hydrogen or a $C_1$ to $C_{12}$ alkyl group, $n$ is about 1 to 30, and R' is hydrogen or R. A specific example of such materials is

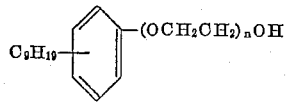

wherein $n$ averages 1.5, which is sold under the trade name Igepal CO–210.

Other dispersing agents such as sorbitan mono- and poly-oleates, polyamine condensates of fatty acids, and quaternary halides of amines, etc. may be used. In sum, any dispersing agent may be used provided it effectively maintains the salt suitably dispersed in the composition. These dispersing agents when used, will be generally added in amounts of 0.001 to 5 wt. percent, e.g. 0.1 to 3 weight percent, based on the weight of the total composition.

The lubricating compositions are readily prepared by adding the desired amount of cross-linked material to the lubricating oil and dispersing the thickener by stirring or milling at temperatures ranging from 50 to 200° F., with 75 to 150° F. being preferred. The metal salt and a dispersing agent, if any, may be added along with the cross-linked polymer. The metal salt may also be formed in situ by adding metal base (e.g. hydroxide) and the desired acid along with the cross-linked polymer. This mixture is then heated to drive off the water. After heating, the lubricant is allowed to cool and may be homogenized, or cut back with more lubricating oil if desired.

The invention will be further understood by the following examples.

I. PREPARATION OF THE CROSS-LINKED SUBSTANCE

Approximately fourteen sample compositions were prepared by subjecting various substances, which are hereinafter described, to ionizing radiation. The method utilized consisted of slurrying the material to be cross linked with about six times its weight of normal heptane. The slurry was then mixed with from 9 wt. percent to 12.5 wt. percent (based on the weight of the material to be cross linked) of a commercial divinyl benzene. The commercial divinyl benzene consisted of about 50 wt. percent solution of an isomeric mixture of divinyl benzene in diethylbenzene and monoethyl vinyl benzene and had a density of 0.900, a bromine number of 170 and was prepared by dehydrogenation of diethylbenzene. The resulting mixture of substance to be irradiated, normal heptane and commercial divinyl benzene, while at room temperature, was then subjected to radiation from a cobalt 60 source at an intensity of one million roentgens per hour, for a total dose of from 4.5 to 39 megaroentgens. The normal heptane was then evaporated and the cross-linked residue was used to prepare a grease.

II. PREPARATION OF LUBRICATING COMPOSITIONS

[All percentages are weight percent]

Various weight percents of the irradiated substances described above were compounded by stirring into fluid lubricants and greases in the proportions and with the base oil vehicle which will be hereinafter described. To these lubricants is added a certain percent of acetic acid, hydrated lime and Nopcogen 12-L (lauric alkylolamide). This mixture was heated to about 350° F. for about 30 minutes in order to form calcium acetate salt, disperse the cross-linked polymer and to dehydrate the mixture. The mixture was cooled to about 250° F. and where indicated in the individual composition descriptions, phenyl alpha naphthylamine was stirred in. The mixture was then cooled to room temperature and inspected.

Example A

A cross-linked substance was prepared according to the procedure of I above with 9 parts by weight of divinylbenzene and 91 parts by weight of castor oil. The radiation dosage used was 15 megaroentgens. A lubricating composition was then prepared according to the technique of II above using: 3% of the irradiated castor oil, 15% glacial acetic acid, 10% hydrated lime, 1% Nopcogen 12-L, 1% phenyl α-naphthylamine and 70% of a hydrofined naphthenic coastal oil having a viscosity of 80 SUS at 210° F.

Example B

A cross-linked substance was prepared according to the procedure of I above with 9 parts by weight of divinylbenzene and 91 parts by weight of soya oil. The radiation dosage used with 15 megaroentgens. A lubricating composition was then prepared according to the technique of II above using: 2.7% of the irradiated soya oil, 19.0% glacial acetic acid, 12.7% hydrated lime, 0.9% Nopcogen 12-L, 0.9% phenyl α-naphthylamine, and 63.8% of the hydrofined coastal oil.

Example C

A cross-linked substance was prepared according to the procedure of I above with 9 parts by weight of divinylbenzene and 91 parts by weight of soya oil. The radiation dosage used was 19.6 megaroentgens. A lubricating composition was then prepared according to the technique of II above using: 3% of the irradiated soya oil, 15% of the glacial acetic acid, 10% hydrated lime, 1% of Nopcogen 12-L, 1% of phenyl α-naphthylamine, and 70% of the hydrofined coastal oil.

Example D

A cross-linked substance was prepared according to the procedure of I above with 10 parts by weight of divinylbenzene and 90 parts by weight of linseed oil. The radiation dosage used was 19.6 megaroentgens. A lubricating composition was then prepared according to the technique of II above using: 3% irradiated linseed oil, 15% glacial acetic acid, 10% hydrated lime, 1% Nopcogen 12-L, and 71% of the hydrofined coastal oil.

Example E

A cross-linked substance was prepared according to the procedure of I above with 10 parts by weight of divinylbenzene and 90 parts of mustard seed oil. The radiation dosage used was 19.6 megaroentgens. A lubricating composition was then prepared according to the technique of II above using: 3% irradiated mustard seed oil, 15% glacial acetic acid, 10% hydrated lime, 1% Nopcogen 12-L, and 71% of hydrofined coastal oil.

Example G

A cross-linked substance was prepared according to the procedure of I above with 9 parts by weight of divinylbenzene and 91 parts of castor oil. The radiation dosage used was 19.6 megaroentgens. A lubricating composition was then prepared according to the technique of II above using: 3.2% of the irradiated caster oil, 24.5% glacial acetic acid, 16.4% hydrated lime, 0.9% Nopcogen 12-L, 0.9% phenyl α-naphthylamine, and 54.1% of di($C_{10}$ Oxo) adipate.

Example H

A cross-linked substance was prepared according to the procedure of I above with 9 parts by weight of divinylbenzene and 91 parts of soya oil. The radiation dosage used was 15 megaroentgens. A lubricating composition was then prepared according to the technique of II above using: 2.8% irradiated soya oil, 22.0% glacial acetic acid, 14.7% hydrated lime, 0.9% Nopcogen 12-L, and 59.6% di($C_{10}$ Oxo) adipate.

Example I

A cross-linked substance was prepared according to the procedure of I above with 9 parts by weight of divinylbenzene and 91 parts of soya oil. The radiation dosage used was 15 megaroentgens. A lubricating composition was then prepared according to the technique of II above using: 1.9% irradiated soya oil, 15.5% glacial acetic acid, 10.5% hydrated lime, 0.7% phenyl α-naphthylamine, 0.7% Nopcogen 12-L and 70.7% di($C_{10}$ Oxo) adipate.

Example J

A cross-linked substance was prepared according to the procedure of I above, except that no heptane or divinylbenzene was used, with 100 parts by weight of a paraffin wax melting at 125° F. derived from a lubricating oil fraction and deoiled by a methylethyl ketone-toluene solvent. The radiation dosage used was 39 megaroentgens. A lubricating composition was then prepared according to the technique of II above using: 4.5% irradiated paraffin wax, 15.0% glacial acetic acid, 10.0% hydrated lime, 1.0 wt. percent of Nopcogen 12-L, and 69.5% of the hydrofined coastal oil.

Example K

A cross-linked substance was prepared according to the procedure of I above with 12.5 parts by weight of divinylbenzene and 87.5 parts of the paraffin wax of Example J. The radiation dosage used was 39 megaroentgens. A lubricating composition was then prepared according to the technique of II above using: 3.5% of irradiated wax, 15.0% glacial acetic acid, 10.0% hydrated lime, 1.0 wt. percent of Nopcogen 12-L and 70.5% of the hydrofined coastal oil.

Example L

A cross-linked substance was prepared by irradiating a mixture of 5 wt. percent of divinylbenzene, 47 wt. percent of an oxidized copolymer of 80 wt. percent butadiene and 20 wt. percent styrene having a molecular weight of about 8,000 and about 10% of oxygen, and 48 wt. percent of a mineral lubricating oil. Said oil is obtained from a Midcontinent crude having a viscosity of 100 SUS at 210° F. The irradiation was accomplished by subjecting the mixture at room temperature to radiation from a cobalt[60] source at an intensity of one million roentgens per hour, for a toal dosage of 15 megaroentgens. A lubricating composition was then prepared according to the technique of II above using: 5% irradiated oxidized butadiene/styrene copolymer, 15.0% glacial acetic acid, 10% hydrated lime, 1% Nopcogen 12-L, and 69% di($C_8$ Oxo) adipate.

*Example M*

A cross-linked substance was prepared according to the procedure of I above except that the material irradiated was composed solely of a commercial divinylbenzene mixed with about six times its weight in normal heptane. The radiation dosage used was 4.5 megaroentgens. A lubricating composition was then prepared according to the technique of II above using: 3% irradiated divinyl benzene, 15.0% acetic acid, 10.0% hydrated lime, 1.0% Nopcogen 12-L, and 71% of the hydrofined oil.

*Example N*

Five wt. percent of commercial divinylbenzene, 15 wt. percent of acetic acid, 10 wt. percent of hydrated lime, 1 wt. percent of Nopcogen 12-L, and 69 wt. percent of the hydrofined oil are stirred and milled together at 130° F. for an hour. The mixture is then heated at 300° F. for 3 hours to drive off the water. After this heating, the lubricant is allowed to cool to room temperature and is then homogenized. The polymer in this example is formed by heating rather than irradiation.

*Example O*

A grease was prepared according to Example N above except that 3 weight percent of divinylbenzene, 15.0 wt. percent glacial acetic acid, 10 wt. percent hydrated lime, 1 wt. percent Nopcogen 12-L, and 71 wt. percent of the hydrofined oil were used.

The fourteen examples above were then tested in various conventional tests. These were the 4-ball test for wear scar, the 4-ball E.P. test for kilograms of load until weld. The conventional test for penetrations and the conventional test for dropping points. The results of these tests, along with the compositions of the above lubricants are summarized in the following table:

|  | A | B | C | D | E | G | H |
|---|---|---|---|---|---|---|---|
| Cross-linked Polymer Composition, Wt. Percent: | | | | | | | |
| Divinylbenzene | 9 | 9 | 9 | 10 | 10 | 9 | 9 |
| Castor Oil | 91 | | | | | 91 | |
| Soya Oil | | 91 | 91 | | | | |
| Linseed Oil | | | | 90 | | | 91 |
| Mustard Seed Oil | | | | | 90 | | |
| Gamma Radiation, megaroentgens | 15 | 15 | 19.6 | 19.6 | 19.6 | 15 | 15 |
| Grease Composition, Wt. Percent: | | | | | | | |
| Cross-linked Polymers | 3 | 2.7 | 3 | 3 | 3 | 3.2 | 2.8 |
| Glacial Acetic Acid | 15 | 19.0 | 15 | 15 | 15 | 24.5 | 22.0 |
| Hydrated Lime | 10 | 12.7 | 10 | 10 | 10 | 16.4 | 14.7 |
| Nopcogen 12-L[1] | 1 | 0.9 | 1 | 1 | 1 | 0.9 | 0.9 |
| Phenyl α-naphthylamine | 1 | 0.9 | 1 | | | 0.9 | 0.9 |
| Mineral Lubricating Oil of 80 SUS at 210° F | 70 | 63.8 | 70 | 71 | 71 | | 59.6 |
| di($C_8$ Oxo) Adipate | | | | | | 54.1 | |
| di($C_{10}$ Oxo) Adipate | | | | | | | |
| Properties: | | | | | | | |
| 4-Ball Test, Wear Scar Diam., mm. (1,800 r.p.m., 1 Hr., 75° C., 10 kg.) | .33 | .30 | .24 | .29 | .29 | .64 | Semifluid. |
| Micro Penetration, mm./10—unworked | | | 333 | 180 | 305 | | |
| Worked 20 strokes | | | 459+ | 235 | 459+ | | |
| ASTM Penetration, mm./10—unworked | 302 | 354 | | | | 358 | Semifluid. |
| Worked 60 strokes | 304 | 347 | | | | 366 | |
| Worked 10,000 strokes | 324 | 358 | | | | | |
| Worked 100,000 strokes | | | | | | 380 | |
| 4-Ball EP Test, kg. to Weld | 335 | 282 | | | | | |
| Dropping Point, ° F | 500+ | 500+ | 500+ | 500+ | 500+ | 500+ | |

|  | I | J | K | L | M | N | O |
|---|---|---|---|---|---|---|---|
| Cross-linked Polymer Composition, Wt. percent: | | | | | | | |
| Mineral oil (100 SUS at 210° F.) | | | | 48 | | | |
| Divinylbenzene | 9 | | 12.5 | 5 | 14.3 | | |
| Heptane | | | | | 85.7 | | |
| Soya Oil | 91 | | | | | | |
| Oxidized butadiene/styrene copolymer | | | | 47 | | | |
| Wax | | 100 | 87.5 | | | | |
| Gamma Radiation, megaroentgens | 15 | 39 | 39 | 15 | 4.5 | | |
| Grease Composition, Wt. percent: | | | | | | | |
| Cross-linked Polymer Composition | 1.9 | 4.5 | 3.5 | 5 | 3.0 | | |
| Divinylbenzene | | | | | | 5.0 | 3.0 |
| Glacial Acetic Acid | 15.5 | 15.0 | 15.0 | 15.0 | 15.0 | 15.0 | 15.0 |
| Hydrated Lime | 10.5 | 10.0 | 10.0 | 10 | 10.0 | 10.0 | 10.0 |
| Nopcogen 12-L | 0.7 | 1.0 | 1.0 | 1.0 | 1.0 | 1.0 | 1.0 |
| Phenyl α-naphthylamine | 0.7 | | | | | | |
| Mineral Oil (80 SUS at 210° F.) | | 69.5 | 70.5 | | | | |
| di($C_8$ Oxo) Adipate | | | | 69 | 71.0 | 69.0 | 71.0 |
| di ($C_{10}$ Oxo) Adipate | 70.7 | | | | | | |
| Properties: | | | | | | | |
| 4-Ball Test, Wear Scar Diam., mm. (1,800 r.p.m., 1 Hr., 75° C., 10 kg.) | .55 | | .30 | .31 | 0.30 | 0.33 | .30 |
| Micro Penetration, mm./10—unworked | fluid | | 70 | 60 | 66 | 80 | 56 |
| Worked 20 strokes | | | 67 | 125 | 83 | 86 | 77 |
| Cone Penetration, mm./10—unworked | | | | | | | |
| Worked 60 strokes | | | | | | | |
| Worked 10,000 strokes | | | | | | | |
| Worked 100,000 strokes | | | | | | | |
| 4-Ball EP Test, kg. to Weld | | | | | | | |
| Dropping Point, ° F | | 500+ | 500+ | 500+ | 500+ | 500+ | 500+ |

[1] Lauric alkylolamide.

As illustrated by Table I, lubricating compositions ranging from fluids to solid greases may be prepared. The solid greases all have excellent dropping points of 500+. Compositions A–E and K–O show very good results as measured by wear scar diameter in the 4-ball test. A variety of penetration values was obtained indicating the lubricants of the invention would be useful in a wide range of applications.

While the preceding examples illustrate the use of a lauryl alkylolamide as a surfactant, alkylphenoxy polyoxyethylene alcohols and ethers can be used in the same manner. To illustrate compositions A–O can be exactly repeated but using

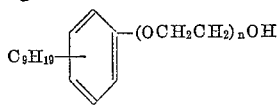

wherein $n$ averages 1.5 in place of the lauryl alkylolamide.

It is also possible to make the lubricating composition of the invention using no surfactant. To illustrate, Examples A–O can be exactly repeated, but eliminating the surfactant entirely; the amount of lubricating oil is increased proportionally to replace the surfactant.

To further illustrate the invention, lubricating compositions may be prepared using a metal salt of an inorganic acid. Thus lubricating compositions are made exactly like compositions A–O except that 25 wt. percent of $CaCO_3$ is used in place of the acetic acid and lime and the amount of the lubricating oil is appropriately varied so that the weight percents of the other constituents remain the same.

What is claimed is:

1. A lubricating grease having a dropping point in excess of 500° F. comprising a major proportion of lubricating oil, 1 to 10 wt. percent of a cross-linked polymer prepared by irradiating with 1 to 50 megaroentgens of ionizing radiation a mixture of (A) an aromatic divinyl cross-linking agent having the general formula:

$$Ar(CH=CH_2)_2$$

wherein Ar is an aryl group and (B) a material selected from the group consisting of petroleum wax, vegetable oil, and an oxidized copolymer of 80 wt. percent butadiene and 20 wt. percent styrene of about 8,000 molecular weight and containing about 10% oxygen, wherein the amount of said divinyl aromatic is about 2 to 20 wt. percent based on the weight of said polymer; and about 10 to 40 wt. percent of calcium acetate.

2. A lubricating grease according to claim 1, having 0.001 to 5 wt. percent of a dispersing agent selected from the group consisting of:

A. Alkylolamides of fatty acids having the general formula:

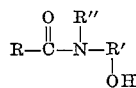

wherein R is a $C_8$ to $C_{20}$ alkyl group, R′ is a $C_2$ to $C_9$ alkyl group with the hydroxyl group attached to any one of the carbon atoms of R′, and R″ is selected from the group consisting of hydrogen and R′—OH; and B. Alkylphenoxy polyoxyethylene alcohols and ethers of the general formula:

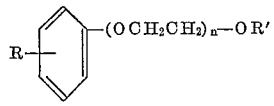

wherein R is selected from the group consisting of hydrogen and $C_1$ to $C_{12}$ alkyl groups, $n$ is about 1 to 30, and R′ is selected from the group consisting of hydrogen and R.

3. A lubricating grease according to claim 1, wherein said material is petroleum wax.

4. A lubricating grease according to claim 1, wherein said material is vegetable oil.

5. A lubricating grease having a dropping point above 500° F. comprising a major amount of mineral lubricating oil, about 1 to 10 wt. percent of a cross-linked polymer prepared by irradiating a mixture of divinyl benzene and petroleum wax with 1 to 50 megaroentgens of ionizing radiation, wherein the amount of said divinyl benzene in said mixture is about 2 to 20 wt. percent of the weight of said polymer, and about 10 to 40 wt. percent of calcium acetate.

6. A lubricating grease having a dropping point above 500° F. comprising a major amount of mineral lubricating oil, about 1 to 10 wt. percent of a cross-linked polymer prepared by irradiating a mixture of divinyl benzene in said mixture is about 2 to 20 wt. percent of the weight of said polymer, and about 10 to 40 wt. percent of calcium acetate.

References Cited in the file of this patent

UNITED STATES PATENTS

| | | |
|---|---|---|
| 2,089,444 | Staudinger et al. | Aug. 10, 1937 |
| 2,127,811 | Eichwald | Aug. 23, 1939 |
| 2,196,670 | Eichwald | Apr. 9, 1940 |
| 2,197,768 | Pier et al. | Apr. 23, 1940 |
| 2,468,798 | Young et al. | May 3, 1949 |
| 2,686,759 | Giammaria | Aug. 17, 1954 |
| 2,771,458 | Gilder et al. | Nov. 20, 1956 |
| 2,803,598 | Black et al. | Aug. 20, 1957 |
| 2,895,915 | Hewett et al. | July 21, 1959 |
| 2,994,679 | Jones et al. | Aug. 1, 1961 |